United States Patent
Caretti et al.

(10) Patent No.: US 9,844,002 B2
(45) Date of Patent: Dec. 12, 2017

(54) METHOD FOR POWER CONSUMPTION OPTIMIZATION IN MOBILE CELLULAR NETWORKS

(71) Applicant: TELECOM ITALIA S.p.A., Milan (IT)

(72) Inventors: Marco Caretti, Turin (IT); Dario Sabella, Turin (IT); Giovanni Stea, Pisa (IT); Antonio Virdis, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/117,322

(22) PCT Filed: Feb. 28, 2014

(86) PCT No.: PCT/EP2014/053954
§ 371 (c)(1),
(2) Date: Aug. 8, 2016

(87) PCT Pub. No.: WO2015/127988
PCT Pub. Date: Sep. 3, 2015

(65) Prior Publication Data
US 2016/0353373 A1   Dec. 1, 2016

(51) Int. Cl.
*H04W 52/02* (2009.01)
(52) U.S. Cl.
CPC ... *H04W 52/0206* (2013.01); *H04W 52/0232* (2013.01); *Y02B 60/50* (2013.01)
(58) Field of Classification Search
CPC ..... H04W 24/02; H04W 28/08; H04W 36/22; H04W 52/0206; H04W 16/32;
(Continued)

(56) References Cited

U.S. PATENT DOCUMENTS

| 2012/0157002 A1 | 6/2012 | Choi |
| 2013/0053091 A1 | 2/2013 | Jorguseski et al. |

(Continued)

FOREIGN PATENT DOCUMENTS

| GB | 2 501 718 A | 11/2013 |
| WO | 2011/138351 A1 | 11/2011 |
| WO | 2012/167817 A1 | 12/2012 |

OTHER PUBLICATIONS

International Search Report dated May 2, 2014 in PCT/EP2014/053954, filed Feb. 28, 2014.
(Continued)

*Primary Examiner* — Keith Ferguson
(74) *Attorney, Agent, or Firm* — Oblon, McClelland, Maier & Neustadt, L.L.P.

(57) ABSTRACT

A method for managing a cellular network, which comprises a plurality of macro nodes defining respective macro cells and a plurality of small nodes within said macro cells, the method comprising, at each current time snapshot of a plurality of time snapshots and for each macro cell, providing, according to a history traffic load of the cellular network, an overload probability in a first configuration of the cellular network with only macro nodes activated. The method further comprises identifying, among said plurality of time snapshots, first candidate time snapshots for small nodes deactivation in each first candidate time snapshot the overload probability being lower than a threshold overload probability, and if the current time snapshot is one among the first candidate time snapshots, deactivating each small node having a current number of allocated radio resources lower than a threshold number.

15 Claims, 5 Drawing Sheets

(58) Field of Classification Search
CPC . H04W 84/045; H04W 92/20; H04W 36/245; H04W 28/0289; H04W 16/08; H04W 36/0061; H04W 16/14; H04W 4/028; H04W 52/343; H04W 72/04; H04W 72/1252
USPC ............ 455/574, 550.1, 434, 438, 450, 453, 455/422.1, 443, 444, 446, 452.1, 422.01, 455/403, 426.1, 426.2; 370/329, 230, 370/252, 236, 332
See application file for complete search history.

(56) References Cited

U.S. PATENT DOCUMENTS

| | | |
|---|---|---|
| 2013/0223317 A1 | 8/2013 | Kudo |
| 2013/0294272 A1 | 11/2013 | Xiao et al. |
| 2013/0310048 A1* | 11/2013 | Hunukumbure .. H04W 52/0206 455/443 |
| 2014/0094186 A1 | 4/2014 | Barberis et al. |

OTHER PUBLICATIONS

Written Opinion dated May 2, 2014 in PCT/EP2014/053954, filed Feb. 28, 2014.

* cited by examiner

METHOD FOR POWER CONSUMPTION OPTIMIZATION IN MOBILE CELLULAR NETWORKS

BACKGROUND OF THE INVENTION

Field of the Invention

The solution according to embodiments of the invention generally relates to wireless communication networks, such as cellular networks (e.g., 2G, 3G and LTE/LTE-Advanced cellular networks). More particularly, the present invention relates to heterogeneous cellular networks, and to a method for efficiently and dynamically managing activation and/or deactivation of (e.g., small) nodes within such cellular networks.

Overview of the Related Art

Cellular networks (e.g., 2G, 3G and LTE/LTE-Advanced cellular networks) allow data traffic (also referred to as traffic load) to be high-speed conveyed between a fixed-location transceiver base station (or node) radiating radio waves over a respective land area (cell) and user equipments (e.g., user terminals, such as cellular phones) within the cell.

Cellular networks have experimented a significant growth in terms of spread and performance, and have recently evolved into heterogeneous cellular networks. Specifically, each heterogeneous cellular network comprises both relatively high-power and wide-coverage nodes (hereinafter, primary or macro nodes), identifying so-called macro cells, and a number of lower-power, smaller-coverage nodes (hereinafter, secondary or small nodes, e.g. micro, pico, femto nodes) identifying small cells within the macro cells for enhancing overall coverage and capacity.

However, due to the growing number of cellular network users and to the growing demand for services requiring very high traffic load (such as multimedia and real-time services) and very demanding "Quality of Service", multiple small nodes are typically deployed within each macro cell, in indoor and outdoor locations and anywhere high capacity is needed.

Thus, compared to traditional homogeneous cellular networks, which are based on macro nodes of comparable power and coverage, in heterogeneous cellular networks high density small nodes may also be deployed without full planning or even in entirely uncoordinated manner.

As known, this can sharpen power consumption issues.

In order to better manage cellular network capacity and performance, and optimize power consumption, solutions are known aimed at properly managing small nodes activation and/or deactivation.

US2012157002 discloses a mobile network control apparatus and an energy saving method. The mobile network control apparatus may calculate a first amount of total consumed power consumed by m base stations to provide a first cell as a coverage range, and a second amount of total consumed power consumed by n base stations to provide a second cell including the first cell as a coverage range. The mobile network control apparatus may save energy by initiating an operation of the n base stations on a high power mode, and by suspending an operation of a remaining base station excluding the n base stations if the first amount of total consumed power is greater than the second amount of total consumed power.

WO2012167817 discloses a method for managing power consumption of a radio access network. The method comprises: defining a cluster comprising at least two radio resource units of the radio access network; defining a parameter indicative of a performance of the cluster and of a power consumption of the cluster, the parameter being expressed as a function of traffic throughputs carried by the radio resource units of the cluster; calculating optimum traffic throughputs as values of the traffic throughputs carried by the radio resource units of the cluster which optimize the parameter; and distributing traffic amongst the radio resource units of the cluster such that the radio resource units of the cluster carry the calculated optimum traffic throughputs.

SUMMARY OF INVENTION

The Applicant has recognized that none of the cited prior art solutions is satisfactory.

Indeed, in such solutions, small nodes activations/deactivations are relatively frequent, which has a negative impact on parameters such as longevity of the cellular network apparatus and Mean Time Between Failures (MTBF), and hence on maintenance costs. Moreover, frequent small nodes switching on/off causes massive handovers, whose effects often ripple in the cellular network at large, thereby causing instability and/or unpredictable performance.

Last but not least, such solutions are not adapted to manage extremely dynamic conditions caused by high density of small nodes, due to latencies (e.g., caused by long processing times).

In view of the above, the Applicant has tackled the problem of efficiently reducing power consumption (while increasing satisfaction in terms of exchanged traffic load) of heterogeneous cellular networks, and, in order to achieve that, has devised an algorithm capable of dynamically managing small nodes activation/deactivation (i.e., activation and/or deactivation) based both on history and current traffic load conditions.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, an aspect of the solution according to one or more embodiments of the invention relates to a method for managing a cellular network comprising a plurality of macro nodes defining respective macro cells and a plurality of small nodes within said macro cells. The method comprises, at each current time snapshot of a plurality of time snapshots and for each macro cell:

providing, according to a history traffic load of the cellular network, an overload probability in a first configuration of the cellular network with only macro nodes activated, identifying, among said plurality of time snapshots, first candidate time snapshots for small nodes deactivation, in each first candidate time snapshot the overload probability being lower than a threshold overload probability, and if the current time snapshot is one among the first candidate time snapshots, deactivating each small node
  having a current number of allocated radio resources lower than a threshold number, and
  being within a macro cell currently having no macro or small nodes in overload condition.

According to an embodiment of the invention, said identifying comprises, for each macro cell, grouping the first candidate time snapshots into groups of adjacent first candidate time snapshots, and ordering said groups of adjacent first candidate time snapshots by decreasing time length, and said deactivating each small node comprises, for each macro cell, deactivating each small node further if the current time snapshot belongs to a group of adjacent first candidate time snapshots having longest time length.

According to an embodiment of the invention, the method further comprises, for each macro cell:

identifying, among said plurality of time snapshots, second candidate time snapshots for small nodes activation, according to said history traffic load and to power consumption models of the cellular network, and activating at least one small node within the macro cell
if the macro cell currently has at least one macro or small nodes in overload condition, or
if the current time snapshot is one of the second candidate time snapshots.

According to an embodiment of the invention, said identifying, among said plurality of time snapshots, second candidate time snapshots for small nodes activation further comprises providing, according to said history traffic load and to said power consumption models of the cellular network, a first average power consumption in the first configuration of the cellular network, and a second average power consumption in a second configuration of the cellular network with both macro and small nodes all activated. In each second candidate time snapshot, the first average power consumption is lower than the second average power consumption.

According to an embodiment of the invention, each second candidate time snapshot further belongs to a group of consecutive time snapshots adjacent to a time snapshot being not among said first candidate time snapshots.

According to an embodiment of the invention, said providing first and second average power consumptions comprises:

according to said history traffic load, providing, for each macro cell, first and second average numbers of allocated radio resources in the first and second configurations, respectively, of the cellular network, and applying said power consumption models of the cellular network to said first and second average numbers of allocated radio resources thereby obtaining said first and second average power consumptions, respectively.

According to an embodiment of the invention, said deactivating each small node having a current number of allocated radio resources lower than a threshold number comprises:

providing a list of small nodes of the cellular network whose current number of allocated radio resources is lower than said threshold number, said list being ordered by increasing number of allocated radio resources, and iterating the following operations:
selecting a first small node of said list,
deactivating the selected first small node
if the selected first small node is within a macro cell currently having no macro or small nodes in overload condition, otherwise removing the last small node from said list, and
if the current time snapshot is one of the first candidate time snapshots, otherwise removing the last small node from said list, and
removing the last small node from said list,
until said list is empty.

According to an embodiment of the invention, said power consumption models comprise:

minimum power consumption of each macro and small nodes of the cellular network, when activated;
power consumption of each macro and small nodes of the cellular network, when deactivated;
power consumption for radio resource allocation by each macro and small nodes of the cellular network.

According to an embodiment of the invention, for each macro cell said threshold number of radio resources depends on the difference in power consumption for allocation of said threshold number of radio resources by each macro and small nodes, and on the difference between power consumptions of the small nodes in activated and deactivated configurations.

Another aspect of the solution according to one or more embodiments of the invention relates to a computer program comprising code means adapted to implement said method when the program is run on a computer.

A further aspect of the solution according to one or more embodiments of the invention relates to a managing system for managing a cellular network comprising a plurality of macro nodes defining respective macro cells and a plurality of small nodes within said macro cells. The managing system comprises:

a first module configured to, at each current time snapshot of a plurality of time snapshots and for each macro cell, provide, according to a history traffic load of the cellular network, an overload probability in a first configuration of the cellular network with only macro nodes activated, a second module configured to, at each current time snapshot and for each macro cell, identify, among said plurality of time snapshots, first candidate time snapshots for small nodes deactivation, in each first candidate time snapshot the overload probability being lower than a threshold overload probability, and a third module configured to, at each current time snapshot and for each macro cell, deactivate each small node if
the current time snapshot is one among the first candidate time snapshots,
the small node has a current number of allocated radio resources lower than a threshold number, and
the small node is within a macro cell currently having no macro or small nodes in overload condition.

According to an embodiment of the invention, the third module is also configured to, at each current time snapshot and for each macro cell:

identify, among said plurality of time snapshots, second candidate time snapshots for small nodes activation, according to said history traffic load and to power consumption models of the cellular network, and activate at least one small node within the macro cell
if the macro cell currently has at least one macro or small nodes in overload condition, or
if the current time snapshot is one of the second candidate time snapshots.

A still further aspect of the solution according to one or more embodiments of the invention relates to a cellular network comprising a plurality of macro nodes defining respective macro cells and a plurality of small nodes within said macro cells, the cellular network further comprising the above-said managing system.

According to an embodiment of the invention, the small nodes define respective small cells smaller than the macro cells.

According to an embodiment of the invention, said small nodes comprise micro, pico, and or femto nodes.

The proposed solution allows dynamically managing small nodes activation/deactivation for reducing power consumption, while meeting traffic load satisfaction, within heterogeneous cellular networks.

Moreover, the proposed solution, as requiring low processing times, is adapted to be used in large-scale heterogeneous scenarios having a large number of macro and small nodes and a large number of users.

BRIEF DESCRIPTION OF THE ANNEXED DRAWINGS

These and other features and advantages of the invention will be made apparent by the following description of some exemplary and non limitative embodiments thereof. For its better intelligibility, the following description should be read making reference to the attached drawings, wherein.

DETAILED DESCRIPTION OF PREFERRED EMBODIMENTS OF THE INVENTION

Figure 1:
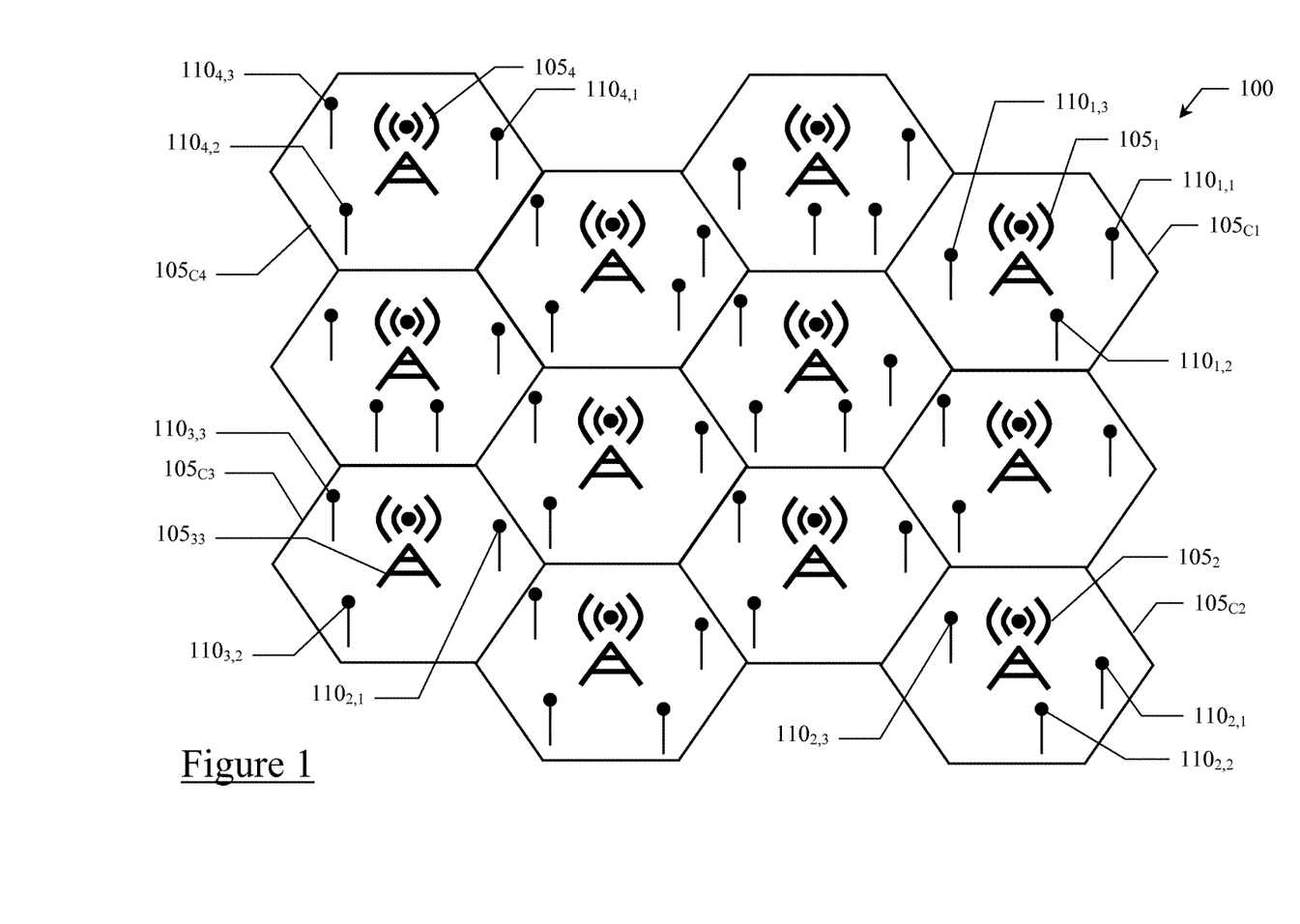
FIG. 1 schematically shows a portion of a cellular network wherein the solution according to embodiments of the invention may be applied.

With reference to the drawings, a portion of a cellular network 100 according to an embodiment of the invention is schematically illustrated in FIG. 1. The cellular network 100 (e.g., compliant with the 3GPP LTE/LTE-Advanced standard) comprises a number N of relatively high-power and wide-coverage transceiver stations (hereinafter, primary or macro nodes) $105_i$ (i=1, 2, 3, 4, . . . N, with N=12 in the example at issue).

Each macro node $105_i$ is configured to provide radio coverage over a relatively wide geographic area, also referred to as macro cell $105_{Ci}$ (for example, hexagonal in shape), for allowing user equipments within the macro cells $105_{Ci}$ (e.g., mobile phones, not shown) to exchange data traffic (e.g., web browsing, e-mailing, voice, or multimedia data traffic), hereinafter traffic load.

As visible in the figure, the cellular network 100 also comprises, within each i-th macro cell $105_{Ci}$, a number $M_i$ of lower-power, smaller coverage nodes (e.g., pico, micro, and/or femto nodes), in the following referred to as secondary or small nodes and denoted by the number reference $110_{i,j}$ (j=1, 2, . . . $M_i$, with $M_i$ ranging from 3 to 4 in the example at issue), each one identifying a respective small cell for increasing cellular network 100 capacity.

For ease of description, the j-di small nodes within the i-th macro cell $105_{Ci}$ (exactly, the small nodes $110_{i,j}$) will be considered as pertaining to (i.e., handled by) the respective i-th macro node $105_i$.

For the sake of completeness, as well known by those having ordinary skill in the art, the macro $105_i$ and small $110_{i,j}$ nodes form the radio access network. In turn, the radio access network is generally communicably coupled with one or more core networks (not shown), which may be coupled with other networks, such as the Internet and/or public switched telephone networks (not illustrated).

According to the invention, an algorithm is provided for effectively managing small nodes $110_{i,j}$ activations/deactivations. As should be readily understood, the algorithm may be performed by proper code means included in a computer program, when the program is run on a computer.

Figure 2:
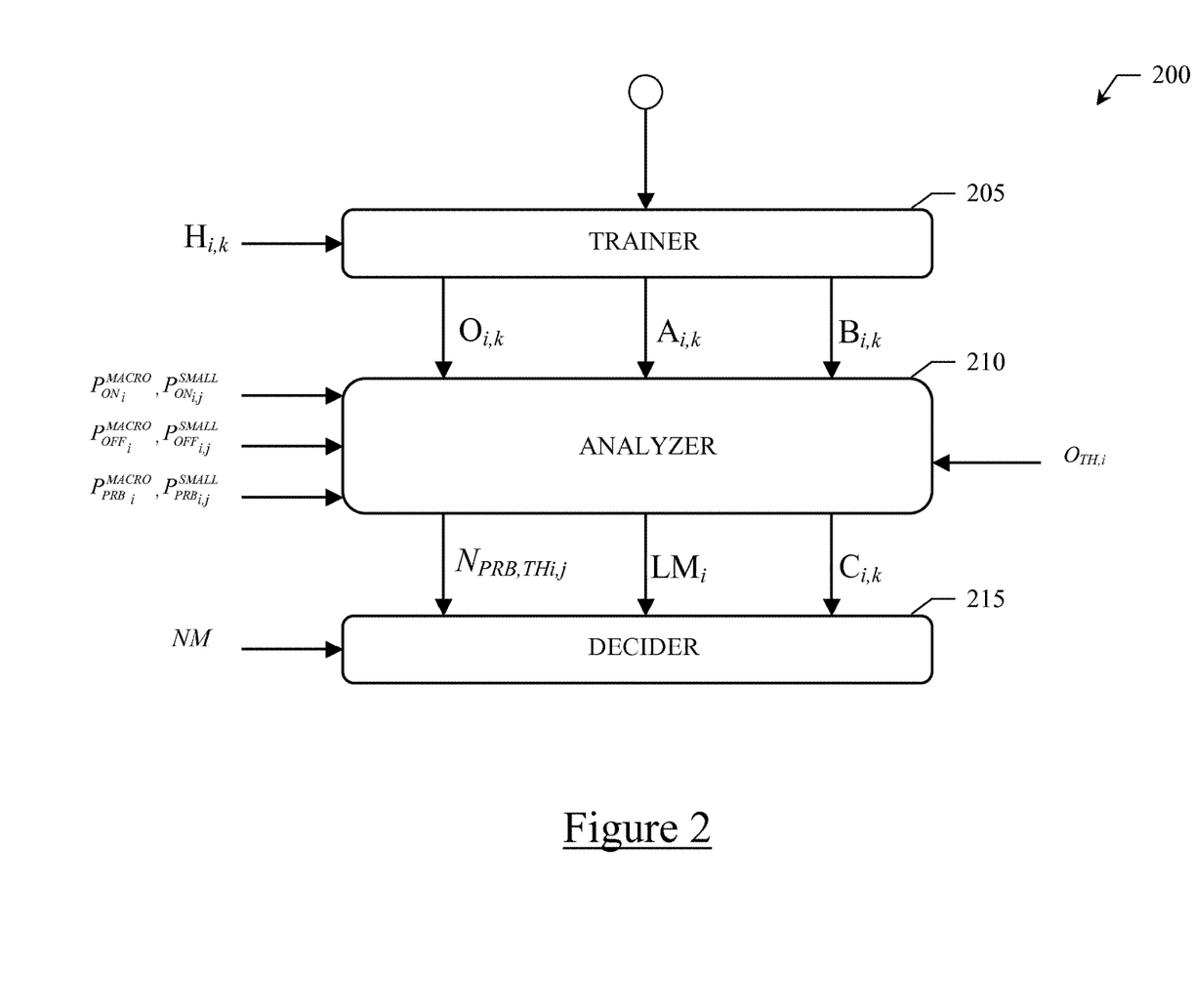
FIG. 2 schematically shows an activity flow of an algorithm adapted to be used in the cellular network, according to an embodiment of the invention.

As visible in FIG. 2, operation of the proposed algorithm (globally denoted by the number reference 200) can be logically identified by three different operative procedures (or modules), namely trainer 205, analyzer 210 and decider 215 modules. The use of the term "module" is herein intended to highlight that the trainer 205, analyzer 210 and decider 215 modules may also reflect, at least conceptually, the physical structure of a managing system intended to implement the proposed algorithm 200. As will be best discussed in the following while progressively detailing the algorithm/managing system operation, the trainer 205, analyzer 210 and decider 215 modules may have, by the physical viewpoint, distributed nature (i.e., each one of them may be implemented in network apparatus physically located inside and/or outside the cellular network 100), it being understood that, by the logical viewpoint, the trainer 205, analyzer 210 and decider 215 modules are all part of the cellular network 100, wherever (and anyhow) their physical implementation takes place.

The trainer module 205 receives, as input, a history traffic load matrix $H_{i,k}$, indicative of a history traffic load of the cellular network 100. Specifically, the history traffic load matrix $H_{i,k}$, having i=1, 2, 3 . . . N rows and k=1, 2, 3, . . . K columns, provides, for each i-th macro cell $105_{Ci}$ (among the N macro cells $105_{Ci}$) of the cellular network 100 and for each k-th time snapshot (among the K time snapshots) of e.g., a day, an indication of the history traffic load of the cellular network 100, such as history number of user equipments and history requests thereof for radio resources (e.g., physical resources blocks, or PRBs, in 3GPP LTE/LTE-Advanced standard). In other words, the (K) $h_{i,k}$ elements of each i-th row of the history traffic load matrix $H_{i,k}$ define, as a whole, a daily traffic load curve for each i-th macro cell $105_{Ci}$ of the cellular network 100. However, different history traffic load matrices may be used to represent different load conditions and distribution in the cellular network 100 (e.g., history number of user equipments and history requests thereof for radio resources during working days, holidays, week-ends, and any other periods of interest), as should be readily apparent to anyone with ordinary skill in the art.

By time snapshot it is herein meant a time span (selected for management purposes) wherein the number of active macro $105_i$ and small $110_{i,j}$ nodes is constant, and may be arbitrarily of the order of minutes or hours.

Without losing generality, each daily traffic load curve can be determined, in a known manner, according to actual (i.e., real) and/or estimated measures, e.g. before and/or during operation of the cellular network 100.

Based on the history traffic load matrix $H_{i,k}$, the trainer module 205 is configured to provide:

an overload matrix $O_{i,k}$. Each element $o_{i,k}$ of the overload matrix $O_{i,k}$ represents the probability that, in a first boundary configuration of the cellular network 100 with only macro nodes $105_i$ activated, the i-th macro node $105_i$ is in an overload condition during the k-th time snapshot (in the following, overload probability);

a first allocation matrix $A_{i,k}$. Each element $a_{i,k}$ of the first allocation matrix $A_{i,k}$ denotes the average number of PRBs allocated by the i-th macro node $105_i$ during the k-th time snapshot, in the first boundary configuration;

a second allocation matrix $B_{i,k}$. Each element $b_{i,k}$ of the second allocation matrix $B_{i,k}$ comprises the number of PRBs allocated for each small node $110_{i,j}$ and for the macro node $105_i$ (belonging to the same i-th macro cell $105_{Ci}$), during the k-th time snapshot, in a second boundary configuration with both macro $105_i$ and small $110_{i,j}$ nodes activated.

The trainer module 205 may be physically implemented within the cellular network 100, for example, at each macro node $105_i$ thereof. As a result, each macro node $105_i$ may be allowed to dynamically determine/update the overload probability for the respective i-th macro cell $105_{Ci}$ according to periodic information from the small nodes $110_{i,j}$ belonging to (i.e., within) the same i-th macro cell $105_{Ci}$.

Alternatively, the trainer module 205 may be physically implemented outside the cellular network 100, for example at a data center thereof (not shown). As a result, the overload probability for each i-th macro cell $105_{Ci}$ may be determined (e.g., predicted) according to periodic information from the cellular network 100.

As visible in FIG. 2, the analyzer module 210 receives, as input, the overload $O_{i,k}$ and allocation $A_{i,k}$, $B_{i,k}$ matrices from the trainer module 205, as well as power consumption models of the (macro $105_i$ and small $110_{i,j}$) nodes. Preferably, such power consumption models comprise, for each macro $105_i$ and small $110_{i,j}$ nodes:

$P_{ON\ i}^{MACRO}$, $P_{ON\ i,j}^{SMALL}$: minimum power consumption of the macro $105_i$ and small $110_{i,j}$ nodes, respectively, when activated;

$P_{OFF\ i}^{MACRO}$, $P_{OFF\ i,j}^{SMALL}$: power consumption of the macro $105_i$ and small $110_{i,j}$ nodes, respectively, when deactivated;

$P_{PRB\ i}^{MACRO}$, $P_{PRB\ i,j}^{SMALL}$: power consumption for each PRB allocated by macro $105_i$ and small $110_{i,j}$ nodes, respectively, wherein addition of indexes i and i,j is intended to indicate that the power consumption models may be different for each macro node $105_i$ of the cellular network 100, and for each small node $110_{i,j}$ belonging to a same macro node $105_i$.

Although, for ease of description, the above power consumption models for each macro $105_i$ and small $110_{i,j}$ nodes will be assumed constant over time, this should not be construed limitatively for the invention. Indeed, by means of a few changes that would be apparent by anyone with ordinary skill in the art, the principles of the invention may also be applied to power consumption models varying over time (e.g. due to a different cost of energy within the day, or according to energy provider policy).

Based on the overload $O_{i,k}$ and allocation $A_{i,k}$, $B_{i,k}$ matrices, and on the power consumption models, the analyzer module 210, in order to achieve traffic load satisfaction and power consumption optimization, determines candidate time snapshots wherein it would be more suitable (e.g., favorable) to activate/deactivate the small nodes $110_{i,j}$, and provides (as better detailed below) a load matrix $LM_i$, a binary consumption matrix $C_{i,k}$ and a threshold number $N_{PRB,THi,j}$ of allocated PRBs.

Figure 3:
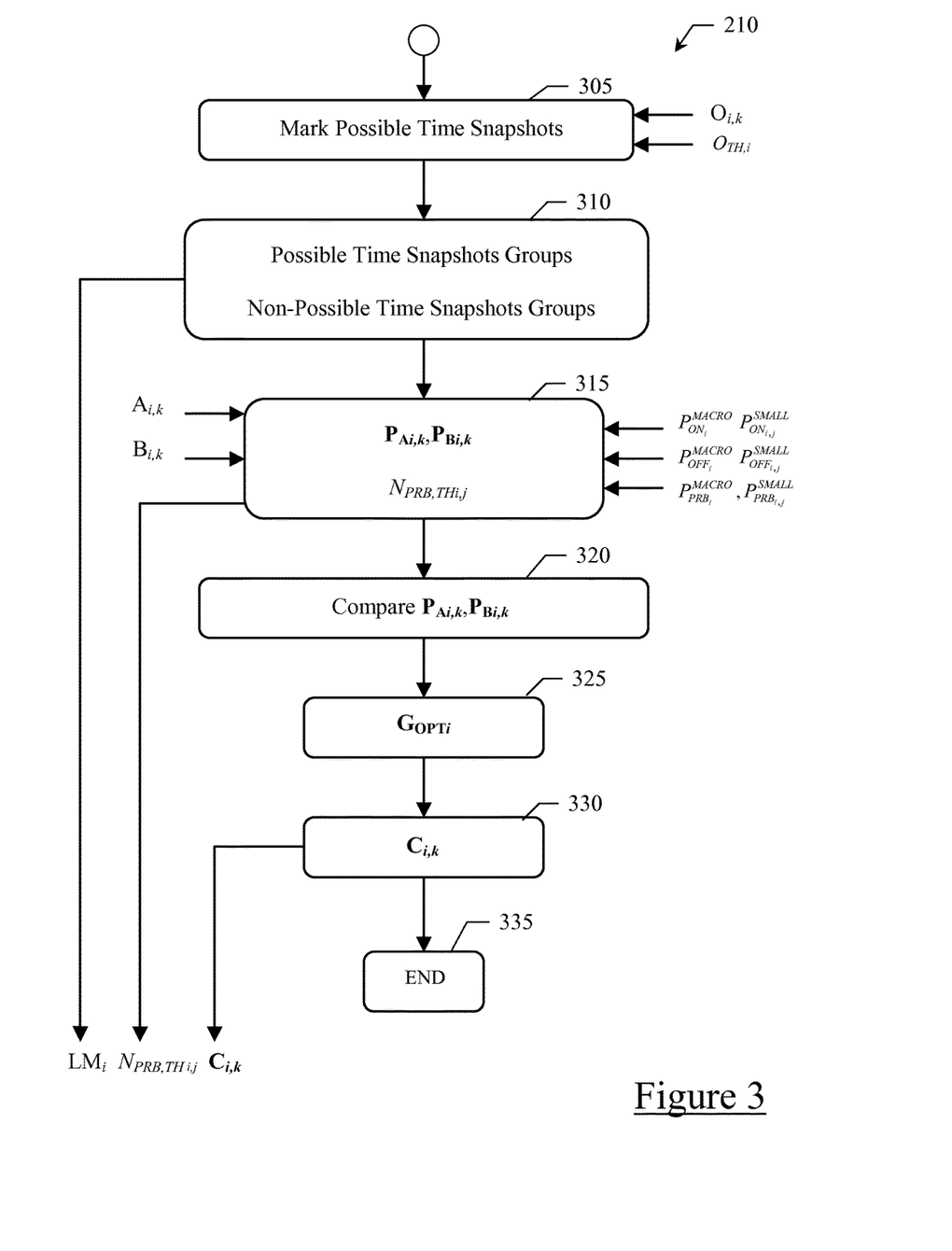
FIG. 3 schematically shows an activity flow of an analysis procedure of said algorithm according to an embodiment of the invention, and FIGS. 4-5 schematically show activity flows of activation/deactivation procedures of said algorithm according to an embodiment of the invention.

Specifically, the analyzer module 210 operates as follows (with joint reference to the activity flow of FIG. 3).

At the activity block 305, the k-th time snapshot in the i-th macro cell $105_{Ci}$ is marked as "possible" (hereinafter, possible time snapshot) if the overload probability in that k-th time snapshot and in the first boundary configuration of the cellular network 100 (i.e., only macro nodes $105_i$ activated), given by the respective element $o_{i,k}$ of the overload matrix $O_{i,k}$, is lower than a predefined overload threshold probability $O_{THi}$ (received by the analyzer module 210, as visible in FIG. 2), namely if $o_{i,j} < O_{THi}$ Then, at the activity block 310, consecutive (i.e., adjacent) possible time snapshots are grouped, for each i-th macro cell $105_{Ci}$, into h=0, 1, 2, . . . G possible time snapshots groups.

The possible time snapshots groups of each i-th macro cell $105_{Ci}$ are preferably ordered by decreasing time length. In the example at issue wherein same time-length time snapshots have been considered, the possible time snapshots groups of each i-th macro cell $105_{Ci}$ are ordered by decreasing number of time snapshots within the groups.

Thereafter, all the possible time snapshots groups for all the i-th macro cells $105_{Ci}$ are gathered in the corresponding load matrix $LM_i$, such that each element of the load matrix $LM_i$ comprises an indication of (e.g., a list of or a pointer to) all the possible time snapshots groups of the i-th macro cell $105_{Ci}$, ordered by decreasing time length.

As will be understood by the following description, ordering by decreasing time length of the possible time snapshots allows minimizing the overall amount of small nodes $110_{i,j}$ switching (i.e., activations and deactivations).

Instead, the k-th time snapshots not marked as "possible" are grouped, for each i-th macro cell $105_{Ci}$, into respective non-possible time snapshots groups (complementary to the respective possible time snapshots groups).

At the activity block 315, the power consumption models are applied. Specifically, the allocation matrices $A_{i,k}$, $B_{i,k}$ are composed with the power consumption models, thereby obtaining corresponding power consumption matrices $P_{Ai,k}$, $P_{Bi,k}$ indicative of the average overall power consumption in each i-th macro cell $105_{Ci}$ in the first and second configurations, respectively. Preferably, the composition operation comprises summing the power consumption of the macro $105_i$ and small $110_{i,j}$ nodes relevant to their activation status (i.e., $P_{ON\ i}^{MACRO}$, $P_{OFF\ i,j}^{SMALL}$ and $P_{ON\ i}^{MACRO}$, $P_{ON\ i,j}^{SMALL}$ for the first and second boundary configurations, respectively) with the product between the elements the allocation matrices $A_{i,k}$, $B_{i,k}$ and the power consumption for each PRB allocated by macro $105_i$ and small $110_{i,j}$ nodes (i.e., $P_{PRB\ i}^{MACRO}$, $P_{PRB\ i,j}^{SMALL}$).

Thereafter, a threshold PRB number $N_{PRB,THi,j}$ is calculated for each small node $110_{i,j}$ from the power consumption models as follows:

$$N_{PRB,TH_{i,j}} \times P_{PRB_{i}}^{MACRO} = (N_{PRB,TH_{i,j}} \times P_{PRB_{i,j}}^{SMALL}) + P_{ON_{i,j}}^{SMALL} - P_{OFF_{i,j}}^{SMALL}$$

In other words, the threshold PRB number $N_{PRB,THi,j}$ denotes the number of PRBs below which small node $110_{i,j}$ deactivation is energetically favorable, being the difference in power consumption for allocation of $N_{PRB,THi,j}$ PRBs by the i-th macro node $105_i$ and the j-di small node $110_{i,j}$ lower than the difference between power consumptions of the j-th small node $110_{i,j}$ in activated and deactivated configurations.

At the activity block 320, each element $p_{Ai,k}$ (associated with the i-th macro cell $105_{Ci}$ and the k-th time snapshot) of the power consumption matrix $P_{Ai,k}$ is compared to the corresponding element $p_{Bi,k}$ of the power consumption matrix $P_{Bi,k}$ (i.e., the one associated with the same i-th macro cell $105_{Ci}$ and the same k-th time snapshot). According to a result of such comparisons, a sub-optimal time snapshot group is formed (for each i-th macro cell $105_{Ci}$), which comprises all the k-th time snapshots (hereinafter, sub-optimal time snapshots) such that the elements $p_{Ai,k}$ of the power consumption matrix $P_{Ai,k}$ are lower than the respective elements $p_{Bi,k}$ of the power consumption matrix $P_{Bi,k}$ (i.e., all the k-th time snapshots wherein the first boundary configuration is, in terms of power consumption, better than the second boundary configuration).

Then (activity block 325), for each i-th macro cell $105_{Ci}$, removal from the sub-optimal time snapshot group of all the k-th sub-optimal time snapshots not belonging to groups or sets (of two or more) of consecutive sub-optimal time snapshots adjacent to non-possible time snapshots takes place, thereby obtaining, for each i-th macro cell $105_{Ci}$, a corresponding time snapshot group of optimal snapshots (or optimal time snapshot group $G_{OPTi}$). In other words, each considered k-th sub-optimal time snapshot is removed from the sub-optimal time snapshot group (in case of removal the snapshot would become an optimal time snapshot of the optimal time snapshot group $G_{OPTi}$) if all the consecutive (i.e., adjacent) k-th sub-optimal time snapshots from the closest non-possible time snapshot (as indicated by the non-possible time snapshot groups) back to the considered k-th sub-optimal time snapshot are still sub-optimal time snapshots.

Finally (activity block 330), a binary matrix $C_{i,k}$ is generated, whose elements $c_{i,k}$ have first/second binary values if, for the i-th macro cell $105_{Ci}$, the k-th time snapshot belongs/does not belong, respectively, to the optimal time snapshot group $G_{OPTi}$, thereafter the activity flow ends (activity block 335)

As better discussed in the following when discussing exemplary deactivation/activation procedures implemented by the analyzer module 215, the possible time snapshots (within the possible time snapshot groups, in the load matrix $LM_i$) represent candidate time snapshots for small nodes ($110_{i,j}$) deactivation (without incurring in overload conditions), whereas the optimal time snapshots (within the optimal time snapshot group $G_{OPTi}$) represent candidate time snapshots for small nodes ($110_{i,j}$) activation (intended to overcome overload conditions or to decrease power consumption of the cellular network 100).

The analyzer module 215 may be physically implemented at any part of the cellular network 100 that is able to communicate with the trainer 210 and decider 220 modules. Indeed, direct communication of the analyzer module 215 with other apparatus of the cellular network 100 is not strictly necessary (especially when static power consumption models, i.e. not requiring updating over time, are provided). However, direct communication of the analyzer module 215 with other apparatus of the cellular network 100 could be provided, e.g. when dynamic power consumption models (i.e. power consumption models subject to updating over time) are desirable.

Back to FIG. 2, the decider module 215 receives, as input, the load $LM_i$ and binary $C_{i,k}$ matrices, as well as the threshold PRB number $N_{PRB,THi,j}$ from the analyzer module 210, and, according to them (and to the network measures NM indicative of the current state of the cellular network 100, e.g. including the number $N_{PRBi,j}$ of PRBs actually allocated by the macro $105_i$ and small $110_{i,j}$ nodes) decides, for each k-th time snapshot, whether to deactivate/activate the small nodes $110_{i,j}$.

Figure 4:
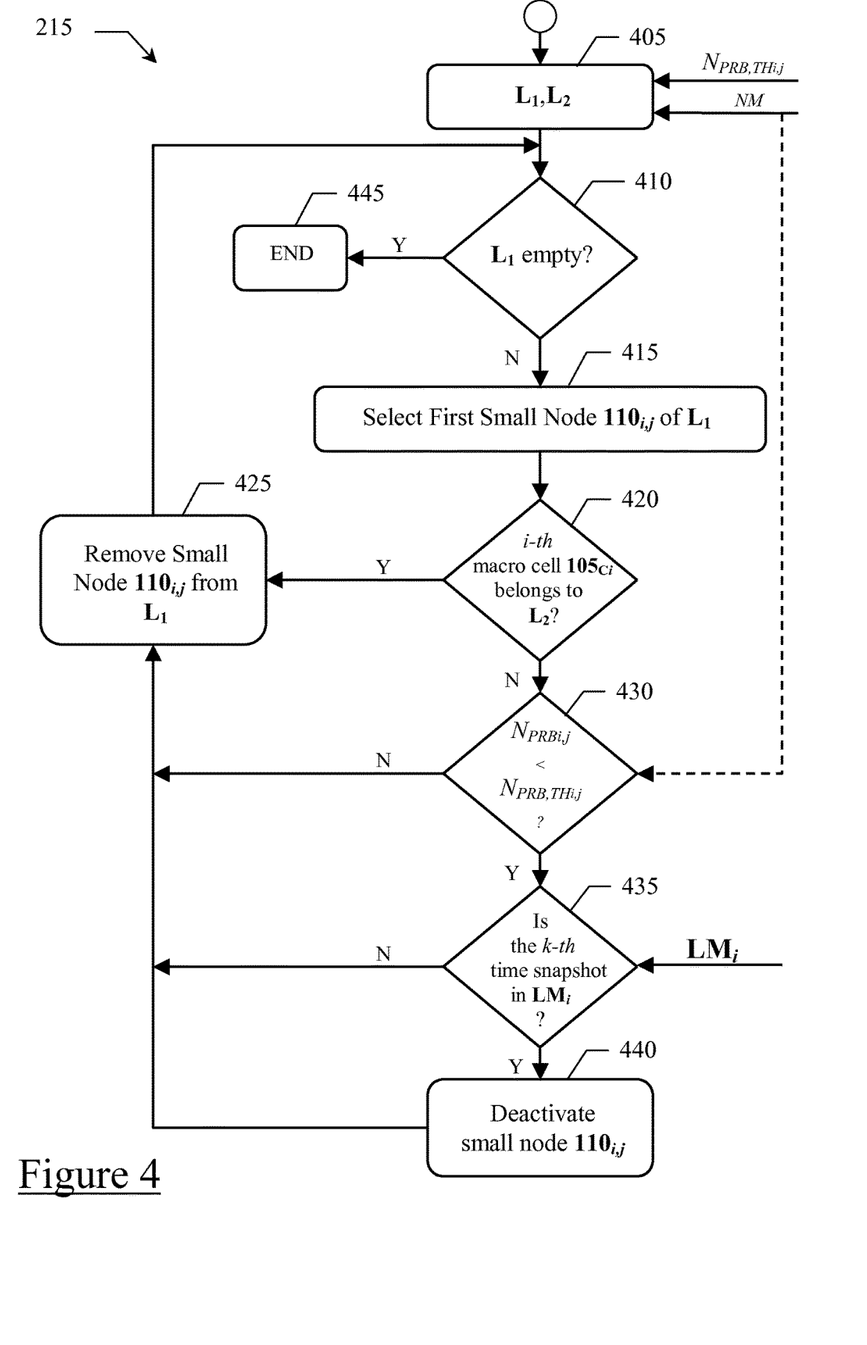

Specifically, small node $110_{i,j}$ deactivation is decided by the decider module 215 as follows (with joint reference to FIG. 4, showing an activity flow of a deactivation procedure according to an embodiment of the invention).

At the activity block 405, the decider module 215, based on said network measures NM, generates:
 a current underload list ($L_1$) comprising (an indication of) all the small nodes $110_{i,j}$ having a (current) number $N_{PRBi,j}$ of allocated PRBs lower than the threshold PRB number $N_{PRB,THi,j}$ (denoting an underload condition of the small nodes $110_{i,j}$). Preferably, the small nodes $110_{i,j}$ in the current underload list $L_1$ are ordered by increasing number $N_{PRBi,j}$ of allocated PRBs. In other words, the small nodes $110_{i,j}$ of the current underload list $L_1$ comprise any j-th small nodes $110_{i,j}$ among the $$\sum_{i=1}^{N} M_i$$

small nodes $110_{i,j}$ of the cellular network 100 whose (current) number $N_{PRBi,j}$ of allocated PRBs is lower than the threshold PRB number $N_{PRB,THi,j}$; and
 a current overload list ($L_2$) comprising an indication of all the i-th macro cells $105_{Ci}$ of the cellular network 100 having at least one (macro $105_i$ or small $110_{i,j}$) node in overload condition.

Broadly speaking, in the considered k-th time snapshot, the small node $110_{i,j}$ that, during the ongoing (current) iteration, has the lowest number $N_{PRBi,j}$ of allocated PRBs in the current underload list $L_1$ is deactivated if all the following conditions are met:
 $N_{PRBi,j} < N_{PRB,THi,j}$;
 the i-th macro cell $105_{Ci}$ which the small node $110_{i,j}$ belongs to is not in the current overload list $L_2$ (i.e., no macro $105_i$ or small $110_{i,j}$ node of the i-th macro cell $105_{Ci}$ is in the overload condition);
 the considered k-th time snapshot is a possible time snapshot (i.e., it belongs to the possible time snapshot group, preferably, as discussed below, to one of the first possible time snapshot groups in the load matrix $LM_{i,k}$).

Specifically, at decision block 410, a check is performed for checking whether the current underload list $L_1$ is empty, or not.

In the negative case, exit branch N of the decision block 410, the small node $110_{i,j}$ that, at the current iteration, has the lowest number $N_{PRBi,j}$ of allocated PRBs (i.e., the first small node $110_{i,j}$ of the current underload list $L_1$, in the example at issue) is selected, thereafter another check is performed (decision block 420) for checking whether the i-th macro cell $105_{Ci}$ which the selected small node $110_{i,j}$ belongs to is within the current overload list $L_2$ (i.e., if the i-th macro cell $105_{Ci}$ which the selected small node $110_{i,j}$ belongs to has at least one macro $105_i$ or small $110_{i,j}$ node in the overload condition).

In the affirmative case, exit branch Y of the decision block 420, the small node $110_{i,j}$ is removed from the current underload list $L_1$ (activity block 425), thereafter the activity flow jumps back to activity block 410, whereby a new (first) small node $110_{i,j}$ of the current (updated) current underload list $L_1$ is selected, and a new iteration is started.

If instead the i-th macro cell $105_{Ci}$ has at least one macro $105_i$ or small $110_{i,j}$ nodes in the overload condition (exit branch N of the decision block 420), a check is performed (decision block 430) for evaluating whether the number $N_{PRBi,j}$ of allocated PRBs of the considered small node $110_{i,j}$ is (still) lower than the threshold PRB number $N_{PRB,THi,j}$, and, in the negative case (exit branch N of the decision block 430), the small node $110_{i,j}$ is removed from the current underload list $L_1$ (activity block 425) and the operation flow at block 410-430 is iterated, as such, until the current underload list $L_1$ is empty.

As should be understood, the decision block 430 may be also omitted in a basic implementation, as being redundant (indeed, the current underload list $L_1$ already comprises the small nodes $110_{i,j}$ having the number $N_{PRBi,j}$ of allocated PRBs lower than the threshold PRB number $N_{PRB,TH_i,j}$, i.e. in underload condition). However, in the preferred embodiment herein disclosed, the decision block 430 is provided for avoiding that small nodes $110_{i,j}$ are selected whose number $N_{PRB_i,j}$ of allocated PRBs becomes higher than the threshold PRB number $N_{PRB,TH_i,j}$ while the deactivation procedure is running. This is conceptually illustrated in FIG. 4, with the decision block 430 that, preferably, also receives, as input, the network parameters NM, and, hence, an updated number $N_{PRB_i,j}$ of allocated PRBs for the selected small node $110_{i,j}$.

Back to the activity flow, if instead the number of allocated PRBs $N_{PRB_i,j}$ of the selected small node $110_{i,j}$ is lower than the threshold PRB number $N_{PRB,TH_i,j}$ (i.e., the small node $110_{i,j}$ is in underload condition), another check is performed for evaluating whether the current k-th time snapshot is a possible time snapshot (decision block 435), namely if the considered k-th time snapshot is one among the possible time snapshots for deactivation of the selected small node $110_{i,j}$.

Preferably, according to performance to be achieved, the check performed at the decision block 435 is aimed at evaluating if, for the macro cell $105_{C_i}$ which the selected small node $110_{i,j}$ belongs to, the considered k-th time snapshot belongs to one of the first f (among the G) possible time snapshot groups in the load matrix $LM_i$ (with f=1, 2, 3, . . . F, F<G). As mentioned above, being the possible time snapshot groups ordered by decreasing (time), small nodes deactivations take place during (and for all the durations of) the longest time snapshots. As a result of that, small nodes switching minimization is achieved.

If the current k-th time snapshot is a possible time snapshot, exit branch Y of the decision block 435, the small node $110_{i,j}$ is deactivated (activity block 440), and the activity flow jumps back to the activity block 425 (with removal of the deactivated small node $110_{i,j}$ from the current underload list $L_1$), and the operation flow at block 410-440 is iterated, as such, until the current underload list $L_1$ is empty. As illustrated, the activity block 425 is reached even if the considered k-th time snapshot is not a possible time snapshot for deactivation of the selected small node $110_{i,j}$ (exit branch N of the decision block 435).

As discussed above, the activity flow ends (activity block 445) as soon as the current underload list $L_1$ is empty (exit branch Y of the decision block 410).

Figure 5:
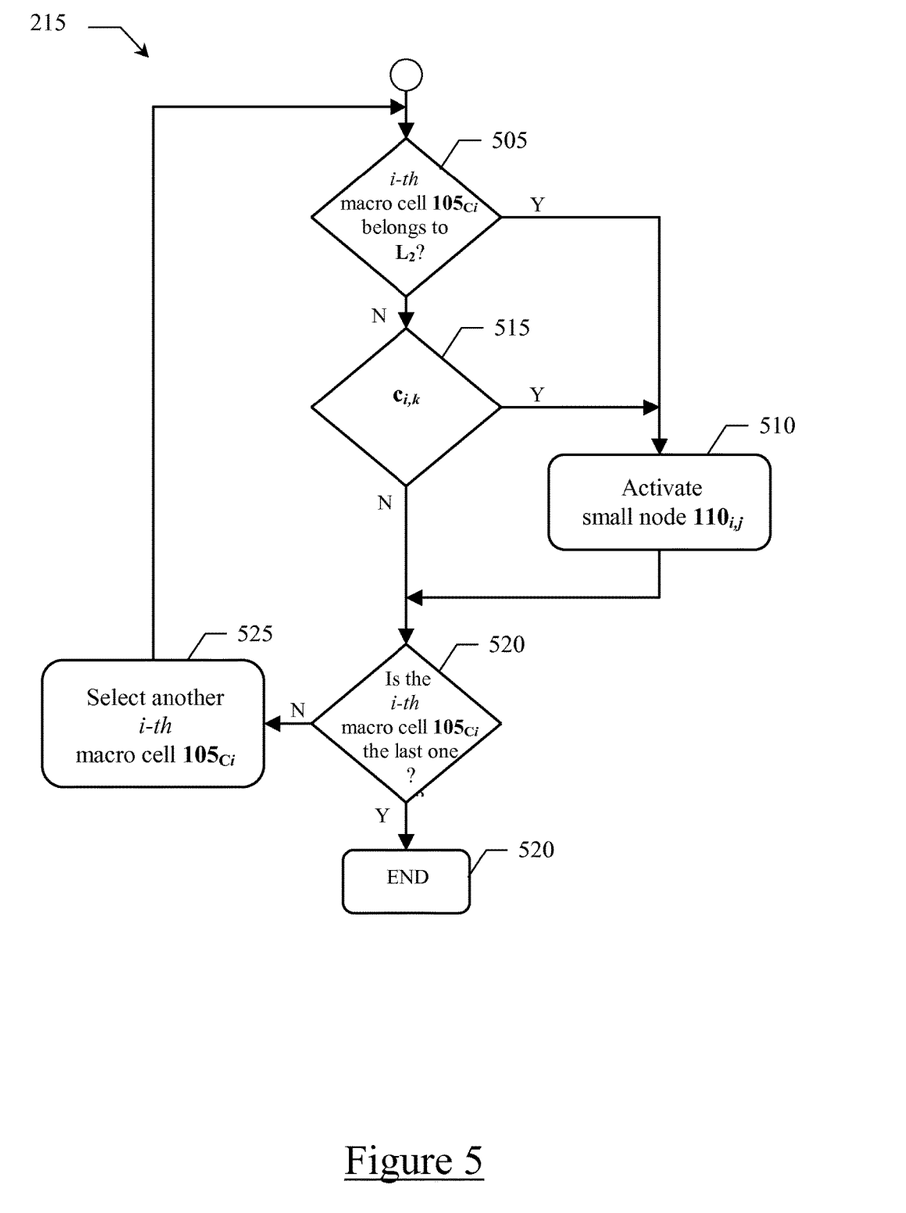

Small node $110_{i,j}$ activation is decided by the decider module 215 as follows (with joint reference to FIG. 5, showing an activity flow of an activation procedure according to an embodiment of the invention).

Broadly speaking, in the considered k-th time snapshot, and for each i-th macro cell $105_{C_i}$, a small node $110_{i,j}$ is activated if at least one of the following conditions is met:
the considered i-th macro cell $105_{C_i}$ is in the current overload list $L_2$ (i.e., one or more macro $105_i$ or small $110_{i,j}$ nodes of the i-th macro cell $105_{C_i}$ is in the overload condition);
the k-th time snapshot is an optimal time snapshot for activation of a small node $110_{i,j}$ in the considered i-th macro cell $105_{C_i}$ (i.e., the k-th time snapshot belongs to the optimal time snapshot group $G_{OPT_i}$, as indicated by the element $c_{i,k}$ of the binary matrix $C_{i,k}$).

Specifically, at decision block 505 a check is performed for checking whether the considered i-th macro cell $105_{C_i}$ is in the current overload list $L_2$.

In the affirmative case, exit branch Y of the decision block 505, one or more j-th small nodes $110_{i,j}$ of the considered i-th macro cell $105_{C_i}$ are selected and activated (activity block 510). In other words, small nodes $110_{i,j}$ activation occurs, in any case, for meeting traffic load demands (and overcoming overload conditions). All small nodes $110_{i,j}$ of the considered i-th macro cell $105_{C_i}$ may be selected and activated. Alternatively, small nodes $110_{i,j}$ of the considered i-th macro cell $105_{C_i}$ may be selected, and activated, according to users parameters, for example according to information of users position within the macro cell $105_{C_i}$ (with such position information that can be based on GPS, historical and/or statistical data).

In the negative case, exit branch N of the decision block 505, another check is performed (decision block 515) for checking whether the element $c_{i,k}$ of the binary matrix $C_{i,k}$ has the first value, indicating that the k-th time snapshot (for the i-th macro cell $105_{C_i}$) belongs to the optimal time snapshot group $G_{OPT_i}$.

In the affirmative case, exit branch Y of the decision block 515, a j-th small node $110_{i,j}$ of the considered i-th macro cell $105_{C_i}$ is selected and activated (activity block 510). In other words, small nodes $110_{i,j}$ activation occurs as being energetically favorable (so as to reduce overall power consumption of the cellular network 100).

Then, the activity flow goes on to decision block 520—as illustrated, the decision block 520 is reached even if the element $c_{i,k}$ of the binary matrix $C_{i,k}$ has the second value, indicating that the k-th time snapshot (for the i-th macro cell $105_{C_i}$) does not belong to the optimal time snapshot group $G_{OPT_i}$.

At the decision block 520 a check is performed for evaluating whether the considered i-th macro cell $105_{C_i}$ is the last (considered) macro cell $105_{C_i}$ of the cellular network 100. In the negative case, exit branch N of the decision block 520, the following, (i+1)-th, macro cell $105_{C_i}$ among the N macro cells $105_{C_i}$ is selected (activity block 525), thereafter the activity flow discussed at blocks 505-525 is repeated, as such, for each (i+1)-th macro cell $105_{C_i}$ of the cellular network 100.

As discussed above, the activity flow ends (activity block 530) as soon as the considered macro cell $105_{C_i}$ is the last one (exit branch Y of the decision block 520).

Additionally, according to another embodiment, not shown, a quality check is finally performed for evaluating/checking the correct execution of the algorithm 200 (or parts thereof pertaining to trainer 205, analyzer 210, and/or decider 215 modules).

The decider module 215 may be physically implemented within one or more macro nodes $105_i$. In this case, the decider module 215 may both receive information from other macro nodes $105_i$ of the cellular network 100 and send activation/deactivation commands to the small nodes $110_{i,j}$, preferably via X2 interface (e.g., by means of "Load Indicator", X2AP-TS 36 423, and Cell Activation Request, X2AP-TS 36.423, messages, respectively).

Alternatively, the decider module 215 may be physically implemented as an external module connected to one ore more macro nodes $105_i$ and to one or more small nodes $110_{i,j}$. In this case, dedicated communication "channels" may be provided between the decider module 215 and the macro nodes $105_i$ (so as to take advantage of the X2 interface for communication with the small nodes $110_{i,j}$).

Another embodiment can entail a non-transitory computer readable medium storing a computer program comprising code adapted to perform the appropriate method.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the wireless communication network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to wireless communication network based on the LTE/LTE-Advanced standard, it should be understood that it is not in the intentions of the Applicant to be limited to the implementation of any particular wireless communication system architecture or protocol. In this respect, it is also possible to provide that, with suitable simple modifications, the proposed method for dynamic activation/deactivation of the small nodes may be applied to any other wireless communication network (e.g., 2G and 3G wireless communications networks) featuring deployment heterogeneity.

The invention claimed is:

1. A method for managing a cellular network, which includes a plurality of macro nodes defining respective macro cells and a plurality of small nodes within said macro cells, the method comprising, at each current time snapshot of a plurality of time snapshots and for each macro cell:
providing, according to a history traffic load of the cellular network, an overload probability in a first configuration of the cellular network with only macro nodes activated;
identifying, among said plurality of time snapshots, first candidate time snapshots for small nodes deactivation, in each first candidate time snapshot the overload probability being lower than a threshold overload probability; and
if the current time snapshot is one among the first candidate time snapshots, deactivating each small node:
having a current number of allocated radio resources lower than a threshold number; and
being within a macro cell currently having no macro or small nodes in overload condition.

2. The method according to claim 1, wherein said identifying comprises, for each macro cell, grouping the first candidate time snapshots into groups of adjacent first candidate time snapshots, and ordering said groups of adjacent first candidate time snapshots by decreasing time length, and
said deactivating each small node comprises, for each macro cell, deactivating each small node further if the current time snapshot belongs to a group of adjacent first candidate time snapshots having longest time length.

3. The method according to claim 1, further comprising, for each macro cell:
identifying, among said plurality of time snapshots, second candidate time snapshots for small nodes activation, according to said history traffic load and to power consumption models of the cellular network; and
activating at least one small node within the macro cell
if the macro cell currently has at least one macro or small nodes in overload condition, or
if the current time snapshot is one of the second candidate time snapshots.

4. The method according to claim 3, wherein said identifying, among said plurality of time snapshots, second candidate time snapshots for small nodes activation further comprises:
providing, according to said history traffic load and to said power consumption models of the cellular network, a first average power consumption in the first configuration of the cellular network, and a second average power consumption in a second configuration of the cellular network with both macro and small nodes all activated,
in each second candidate time snapshot the first average power consumption being lower than the second average power consumption.

5. The method according to claim 4, wherein each second candidate time snapshot further belongs to a group of consecutive time snapshots adjacent to a time snapshot being not among said first candidate time snapshots.

6. The method according to claim 4, wherein said providing first and second average power consumptions comprises:
providing, for each macro cell, according to said history traffic load, first and second average numbers of allocated radio resources in the first and second configurations, respectively, of the cellular network, and
applying said power consumption models of the cellular network to said first and second average numbers of allocated radio resources thereby obtaining said first and second average power consumptions, respectively.

7. The method according to claim 3, wherein said power consumption models comprise:
minimum power consumption ($P_{ON_i}^{MACRO}$, $P_{ON_{ij}}^{SMALL}$) of each macro and small nodes of the cellular network, when activated;
power consumption ($P_{OFF_i}^{MACRO}$, $P_{OFF_{ij}}^{SMALL}$) of each macro and small nodes of the cellular network, when deactivated;
power consumption ($P_{PRB_i}^{MACRO}$, $P_{PRB_{ij}}^{SMALL}$) for radio resource allocation by each macro and small nodes of the cellular network.

8. The method according to claim 7, wherein, for each macro cell said threshold number of radio resources depends on the difference in power consumption for allocation of said threshold number of radio resources by each macro and small nodes, and on the difference between power consumptions of the small nodes in activated and deactivated configurations.

9. The method according to claim 1, wherein said deactivating each small node having a current number of allocated radio resources lower than a threshold number comprises:
   providing a list of small nodes of the cellular network whose current number of allocated radio resources is lower than said threshold number, said list being ordered by increasing number of allocated radio resources, and
   iterating the following operations until said list is empty:
      selecting a first small node of said list;
      deactivating the selected first small node
         if the selected first small node is within a macro cell currently having no macro or small nodes in overload condition, otherwise removing the last small node from said list, and
         if the current time snapshot is one of the first candidate time snapshots, otherwise removing the last small node from said list, and
      removing the last small node from said list.

10. A non-transitory computer readable medium storing a computer program comprising code adapted to perform the method of claim 1 when the program is run on a computer.

11. A managing system for managing a cellular network comprising a plurality of macro nodes defining respective macro cells and a plurality of small nodes within said macro cells, the managing system comprising:
   circuitry configured to
      at each current time snapshot of a plurality of time snapshots and for each macro cell, provide, according to a history traffic load of the cellular network, an overload probability in a first configuration of the cellular network with only macro nodes activated;
      at each current time snapshot and for each macro cell, identify, among said plurality of time snapshots, first candidate time snapshots for small nodes deactivation, in each first candidate time snapshot the overload probability being lower than a threshold overload probability; and
      at each current time snapshot and for each macro cell, deactivate each small node if
         the current time snapshot is one among the first candidate time snapshots,
         the small node has a current number of allocated radio resources lower than a threshold number, and
         the small node is within a macro cell currently having no macro or small nodes in overload condition.

12. The managing system according to claim 11, wherein the circuitry is also configured to, at each current time snapshot and for each macro cell:
   identify, among said plurality of time snapshots, second candidate time snapshots for small nodes activation, according to said history traffic load and to power consumption models of the cellular network, and
   activate at least one small node within the macro cell
      if the macro cell currently has at least one macro or small nodes in overload condition, or
      if the current time snapshot is one of the second candidate time snapshots.

13. A cellular network comprising:
   a plurality of macro nodes defining respective macro cells and a plurality of small nodes within said macro cells; and
   the managing system according to claim 11.

14. The cellular network according to claim 13, wherein the small nodes define respective small cells smaller than the macro cells.

15. The cellular network according to claim 13, wherein said small nodes comprise micro, pico, and or femto nodes.

* * * * *